US012698814B2

(12) United States Patent
Borchardt et al.

(10) Patent No.: US 12,698,814 B2
(45) Date of Patent: Aug. 4, 2026

(54) FLAT SPRING

(71) Applicant: Christian Bauer GMBH + CO. KG, Welzheim (DE)

(72) Inventors: Lars Borchardt, Welzheim (DE);
Gunter Buerkle, Auenwald (DE);
Rainer Schiessle, Schwieberdingen (DE)

(73) Assignee: Christian Bauer GMBH + CO. KG (DE)

( * ) Notice: Subject to any disclaimer, the term of this patent is extended or adjusted under 35 U.S.C. 154(b) by 226 days.

(21) Appl. No.: 18/100,566

(22) Filed: Jan. 23, 2023

(65) Prior Publication Data

US 2023/0235804 A1 Jul. 27, 2023

(30) Foreign Application Priority Data

Jan. 24, 2022 (DE) ...................... 10 2022 200 760.3

(51) Int. Cl.
F16F 1/02 (2006.01)
F16F 1/18 (2006.01)
(52) U.S. Cl.
CPC .............. F16F 1/185 (2013.01); F16F 1/025 (2013.01); F16F 1/182 (2013.01); *F16F 2234/06* (2013.01)
(58) Field of Classification Search
CPC .. F16F 1/027; F16F 1/185; F16F 1/182; F16F 2234/06; F16F 1/025
USPC ............................ 267/158, 159, 161, 42, 182
See application file for complete search history.

(56) References Cited

U.S. PATENT DOCUMENTS 57,312 A * 8/1866 Greenwalt ................ F16F 1/26
267/53
133,102 A * 11/1872 Hollings ................ A47C 7/285
267/109
467,376 A * 1/1892 King ...................... B60G 11/02
267/42

(Continued)

FOREIGN PATENT DOCUMENTS

DE 397308 C 6/1924
DE 3222257 A1 12/1983
(Continued)

OTHER PUBLICATIONS

English abstract for DE-1 589 250.
(Continued)

*Primary Examiner* — Thomas J Williams
(74) *Attorney, Agent, or Firm* — Fishman Stewart PLLC

(57) ABSTRACT

A flat shaped spring may include a spring element. The spring element may have, in a longitudinal section along a central longitudinal axis extending along an axial direction, two profile halves disposed on opposite sides of the central longitudinal axis. The two profile halves may each have a first profile portion and a second profile portion. The first profile portion may have a curvature opposed to the second profile portion. Two outer ends of the spring element facing away from the central longitudinal axis, and which lie opposite one another in a longitudinal direction extending perpendicularly to the axial direction, may be connected to one another via at least one connection element such that the spring element and the at least one connection element collectively form a closed profile in the longitudinal section.

19 Claims, 2 Drawing Sheets

(56) References Cited

U.S. PATENT DOCUMENTS

| | | | | | |
|---|---|---|---|---|---|
| 2,734,958 | A | * | 2/1956 | Immel .................. | H01H 13/365 |
| | | | | | 267/159 |
| 5,094,434 | A | * | 3/1992 | Ryu ................. | G11B 23/08721 |
| 7,249,756 | B1 | * | 7/2007 | Wilke ........................ | F16F 3/08 |
| | | | | | 267/152 |
| 2020/0138152 | A1 | * | 5/2020 | Vuille ....................... | A44C 5/14 |
| 2023/0235804 | A1 | * | 7/2023 | Borchardt ............... | F16F 1/027 |
| | | | | | 267/164 |

FOREIGN PATENT DOCUMENTS

| | | | | | | |
|---|---|---|---|---|---|---|
| DE | 10004015 | A1 | * | 8/2001 | ............... | F16F 1/18 |
| DE | 10202114 | A1 | | 9/2002 | | |
| DE | 102004037678 | A1 | | 3/2006 | | |
| DE | 102019211595 | A1 | | 2/2021 | | |
| EP | 1589250 | A1 | | 10/2005 | | |
| EP | 1878363 | A1 | * | 1/2008 | ............. | F16F 1/027 |
| JP | 57021847 | B2 | | 2/1974 | | |
| JP | 2003042207 | A | * | 2/2003 | ............. | F16F 1/027 |
| JP | 5575546 | B2 | | 8/2014 | | |
| KR | 2002080982 | A | * | 10/2002 | ............. | F16F 1/182 |
| WO | 2018077741 | A1 | | 5/2018 | | |

OTHER PUBLICATIONS

English abstract for DE-32 22 257.
English abstract DE-102019211595.
English abstract for DE-10 2004 037 678.
English abstract for DE-102 02 114.
German Search Report for DE-102022200760.3, mailed Jul. 25, 2022 (w_machine_translation).
English abstract for JP-55-75546.

\* cited by examiner

FLAT SPRING

CROSS-REFERENCE TO RELATED APPLICATIONS

This application claims priority to German Patent Application No. DE 10 2022 200 760.3, filed on Jan. 24, 2022, the contents of which is hereby incorporated by reference in its entirety.

TECHNICAL FIELD

The invention relates to a flat shaped spring and a flat shaped spring arrangement with such a flat shaped spring.

BACKGROUND

Flat shaped springs have a variety of applications, e.g. in motor vehicles as torque limiters of gear couplings, as restoring units for disc brakes or as prestressing of, for example, bearings and so-called "stacks" for fuel cells. Flat shaped springs are able to receive very great external forces with a small installation space requirement and have a long lifespan.

Conventional flat shaped springs are often to have non-linear, horizontal or degressive characteristics, which describe the ratio of the spring force over the spring travel. In conventional flat shaped springs, to achieve great spring travels, several springs have to be layered to form a column, which in turn must be guided with a pin. This proves to be also technically relatively laborious and therefore cost-intensive for the production of the flat shaped spring. In addition, such a conventional flat shaped spring requires a relatively large amount of installation space owing to its geometry and thus can not be integrated into applications with limited installation space.

In EP 1 589 250 A1 a tension-compression spring composed of several spring elements, of two spring elements, is described, at least one of which has a non-linear characteristic. It is disadvantageous here that this spring is composed of two spring elements which are shaped in a complicated manner, which require a high axial overall height and a guide element. In many applications, however, only a limited installation space is available.

In DE 32 22 257 A1 an axially loadable tension, compression or tension-compression spring is described, which is constructed from a bar or flat profile, between the straight axial clamping ends of which, at which the forces are introduced, there lies a region which is corrugated in a multiple manner and the corrugation is configured so that the spring can be mounted in a torque-free manner. It proves to be disadvantageous here that the spring is constructed very high, has to be securely clamped at both ends and only permits very small forces.

From DE 102 02 114 A1 a corrugated single-leaf spring is known, produced from glass fibre composite material, for an undercarriage. The leaf spring which is described here is mounted rotatably at its ends and has a multiple linear characteristic with a progressive characteristic course, i.e. the spring force increases over the spring deflection. It is disadvantageous here that the spring must be fastened at its ends.

From WO2018/077741A1 there is a spring element for a mattress consisting of a sleeve pair of two sleeves, which consists of a closed band. The two sleeves are connected to one another by a connection piece, lying opposite respectively at a location of their circumference. No information is to be found concerning the characteristic shape. The loops consist of only one curvature and one connecting arc, therefore a linear characteristic course is to be expected.

From DE10 2004 037 678A1 a clamping device is known, which is configured from spring elements, tension elements, such as e.g. bar, cable, wire, chain, band or fibre material. This clamping device consists of a plurality of components and is therefore very costly. A degressive characteristic course is not described and would only be conceivable with the use of a plate spring column.

From DE 10 2019 211 595 A1 a fuel cell stack is known, which is clamped by a gas compression spring and two end plates. A disadvantage here is the high degree of effort which is necessary in the form of electrics and refilling of the gas compression spring.

From DE 10 2020 219 022A1 a clamping system for a fuel cell stack is known, which describes a spring element between a pressure plate and an end plate and has a degressive or horizontal, in particular a flat degressive characteristic. Furthermore, a continuously self-adjusting fastening device is mentioned for the adaptable fastening of the end plate on a further end plate of a further clamping system for clamping a fuel cell stack. It is disadvantageous here that two end plates are necessary and this increases the costs, the weight of the stack, and the installation space.

The spring body—also designated as "spring element" in the following—of a conventional flat shaped spring is typically able to be loaded in the direction of its central longitudinal axis and can be stressed in both resting and also oscillating manner. The introduction of force into the spring body or respectively into the spring element takes place normally via the upper inner edge and the lower outer edge or vice versa.

However, in such flat shaped springs with degressive force-spring characteristic, their structurally complex composition of several individual springs proves to be disadvantageous. This leads to increased costs in production, in particular compared to simple individual springs with non-degressive force-path characteristic.

SUMMARY

It is therefore an object of the present invention to create an improved embodiment of a flat shaped spring, which is distinguished in particular by improved spring characteristics with low production costs. In particular, such a flat shaped spring is to generate an almost constant spring force over as great a path as possible.

This problem is solved by a flat shaped spring according to the independent claim(s). Preferred embodiments are the subject matter of the dependent claim(s).

The basic idea of the invention is accordingly to prevent an undesired transverse displacement of a profile of a spring element of a flat shaped spring which is curved at least twice by realizing this profile as a closed profile.

By realizing several successive profile portions with different curvature, a flat shaped spring with non-linear characteristic is produced here. The configuration as a closed profile, essential to the invention, leads to the characteristic having the desired degressive and—alternatively or additionally—almost horizontal characteristic portions.

The connection of the two end portions of the curved profile portions, lying opposite one another, necessary for the configuration of the closed profile, is realized according to the invention by means of a connection element of the flat shaped spring. This can both be integrated into the spring element and also can be undertaken by a separate component.

By changing the curvatures of the profile, the actual spring characteristic of the respective flat shaped spring can be varied. Further variation parameters can be the width, thickness and also length of the flat shaped spring. The flat shaped spring according to the invention thus enables the realization of a degressive spring characteristic which can be varied in an application-specific manner by simple adaptations of the different curvatures and can thus be adapted to the respective application. Moreover, the flat shaped spring according to the invention, which is presented here, is also able to be produced very easily and therefore economically owing to its simple construction.

In detail, a flat shaped spring according to the invention comprises a spring element which has a central longitudinal axis extending along an axial direction and which comprises in a longitudinal section along the central longitudinal axis on both sides of the central longitudinal axis respectively a first and a second profile portion. The two first profile portions have here a curvature which is opposed to the two second profile portions. The two first profile portions can therefore respectively have a positive curvature, wherein in this case the two second profile portions have a negative curvature. Conversely, the two first profile portions can also respectively have a negative curvature, wherein in this case the two first profile portions have a negative curvature. The radii of curvature of the two first profile portions can be identical or different from one another in all variants. The radii of curvature of the two second profile portions can likewise be identical or different from one another in all variants. The radii of curvature respectively of a first and of a second radius of curvature—with opposite signs—can also be identical or different from one another. According to the invention, in the longitudinal section, two outer ends or/and outer end portions of the spring element facing away from the central longitudinal axis, which lie opposite one another in a longitudinal direction perpendicularly to the axial direction, are connected to one another by means of at least one connection element, so that the spring element and the connection element in the longitudinal section form together the closed profile of the flat shaped spring.

In a preferred embodiment of the invention, the two second profile portions are respectively arranged in a greater portion than the first profile portion respectively associated with respect to the central longitudinal axis. In this embodiment, the first profile portion has a positive curvature and the second profile portion has a negative curvature. By adaptation of the opposed curvature of the two profile portions, the precise course of the spring characteristic can be manipulated and adapted in an extremely flexible manner to particular application requirements.

According to an advantageous further development of the invention, the spring element has a third profile portion which is arranged at a greater distance from the central longitudinal axis than the first or/and second profile portion. In this embodiment, the third profile portion has a positive curvature. In this way, the spring path which the spring element can undergo, can be increased.

According to a further advantageous further development, the spring element has a fourth profile portion, which is arranged at a greater distance from the central longitudinal axis than the first or/and second or/and third profile portion. In this further development, the fourth profile portion is configured in a curvature-free manner. In this way, the mechanical stresses formed in the flat shaped spring in operation can be reduced and in particular can be kept small.

In simplified variants and thus economical variants of the flat shaped spring according to the invention, one or more of the profile portions mentioned above can be dispensed with, with the exception of the two first and second profile portions.

In a further preferred embodiment, the connection element extends in a rectilinear manner. Alternatively or additionally in this embodiment, the connection element extends along the longitudinal direction, which extends perpendicularly to the axial direction away from the central longitudinal axis. Both variants are distinguished by a small installation space requirement in axial direction.

According to an advantageous further development, a first and at least a second connection element are provided. In this further development, in a top view onto the spring element along the axial direction, the profile portions are arranged, preferably in a sandwich-like manner, between the first and the second connection element. In this way, a longitudinal-shaped flat shaped spring is realized.

In another preferred embodiment, in top view the two connection elements and the profile portions of the spring elements extend parallel to one another. This variant is also distinguished by a high mechanical stability with, at the same time, a small installation space requirement.

Particularly preferably, the connection element can be configured in a web-like manner, therefore as a connection web. Such a connection web is able to be realized in a technically simple manner, resulting in cost advantages in the production of the flat shaped spring.

In another preferred embodiment, the at least one connection element can be formed integrally on the spring element and thus in particular integrally on the profile portions. This variant is very simple to produce and therefore particularly economical. Alternatively thereto, however, the connection element can also be configured separately to the spring element, therefore as a separate component with respect to the spring element. This permits the use of different materials for the connection element and for the profile portions of the spring element. In the latter case, the connection element can be connected to the spring element in a non-detachable manner, in particular by means of at least one welded or soldered connection, or in a detachable manner, in particular by means of at least one screw connection.

According to a further advantageous further development, the two outer end portions are part of a fifth profile portion, which is arranged along the longitudinal direction at a greater distance from the central longitudinal axis than the first or/and second or/and third or/and fourth profile portion. In this further development, the fifth profile portion has a positive curvature.

In another preferred embodiment, the flat shaped spring has at least partially a degressive or almost horizontal standardized force-path characteristic. Particularly preferably, the standardized force-path characteristic can have a first characteristic portion with a degressive characteristic course, which continues into a second characteristic portion with an almost horizontal characteristic course.

The invention further relates to a flat shaped spring arrangement with a first and at least a second flat shaped spring element according to the invention, respectively presented above. The advantages of the flat shaped spring according to the invention are therefore transferred also to the flat shaped spring arrangement according to the invention. In the flat shaped spring arrangement according to the invention, a first spring element of the first flat shaped spring and at least a second spring element of the second flat shaped spring are connected to one another by their two end portions, facing one another in longitudinal direction, so that a longitudinal extending of the individual spring elements is prevented.

In a preferred embodiment of the flat shaped spring arrangement according to the invention, the two end portions, facing one another, are connected with the connection element.

In a further preferred embodiment of the flat shaped spring arrangement according to the invention, at least two, preferably several, spring elements can form a predetermined geometry, preferably a multi-sided shape or polygon, particularly preferably a quadrilateral, in particular a rectangle.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically.

DETAILED DESCRIPTION

Figure 1:
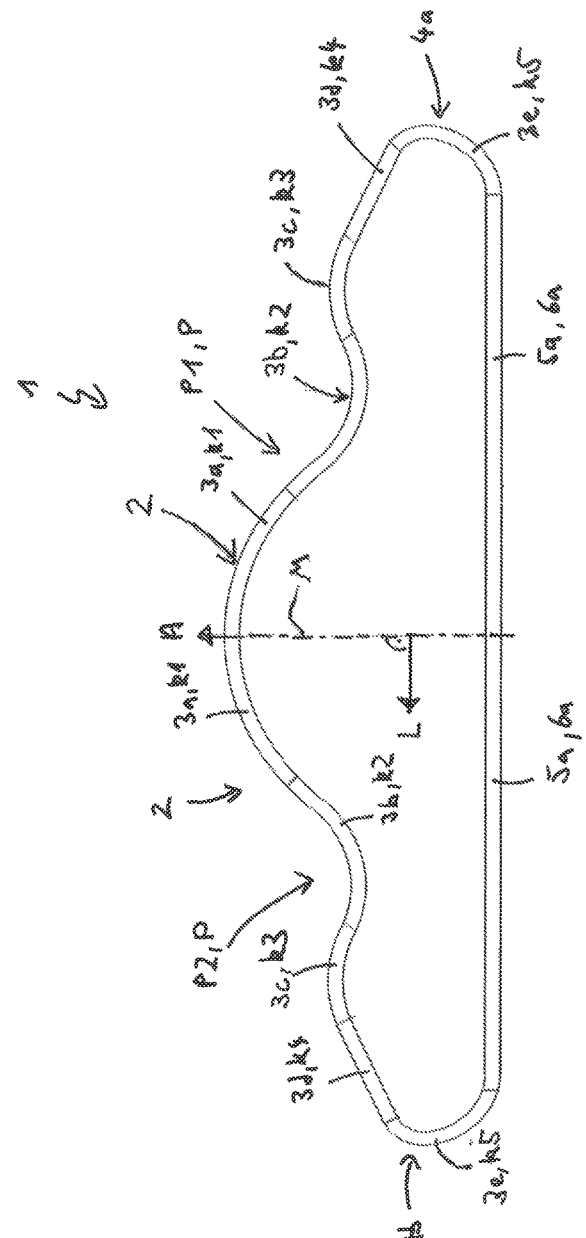
FIG. 1 shows an example of a flat shaped spring according to the invention, in a longitudinal section.

FIG. 1 shows an example of a flat shaped spring 1 according to the invention in a longitudinal section along an axial direction A of the flat shaped spring 1. The flat shaped spring 1 comprises a spring element 2, the central longitudinal axis M of which extends along the axial direction A. A longitudinal direction L of the flat shaped spring 1 extends perpendicularly to the axial direction A away from the central longitudinal axis M.

According to FIG. 1, the spring element 2 in the longitudinal section which is shown has several profile portions 3a.1, 3b.1, 3c.1, 3d.1, 3e.1 and 3a.2, 3b.2, 3c.2, 3d.2, 3e.2 of different curvature k1, k2, k3, k4, k5, extending along the longitudinal direction L on both sides away from the central longitudinal axis M and following one another along the longitudinal direction L, which are explained more precisely in the following.

In the example of FIG. 1, the profile P is configured axially symmetrically with respect to the central longitudinal axis M, so that the profile P is composed of two profile halves P1, P2 which are arranged symmetrically to the central longitudinal axis M and are identical. The profile portions 3a.1-3e.1 are part of the first profile half P1. The profile portions 3a.2-3e.2 are part of the second profile half P2.

In the longitudinal section of FIG. 1, the spring element 2 has two first profile portions 3a.1, 3a.2, and two second profile portions 3b.1, 3b.2, wherein the two second profile portions 3b.1, 3b.2 are arranged along the longitudinal direction L respectively at a greater distance from the central longitudinal axis M than the two first profile portions 3a.1, 3a.2. In addition, the spring element 2 has two third profile portions 3c.1, 3c.2, which are arranged along the longitudinal direction L respectively at a greater distance from the central longitudinal axis M than the first and second profile portions 3a.1, 3a.2, 3b.1, 3b.2. Furthermore the spring element 2 has two fourth profile portions 3d.1, 3d.2, which is arranged along the longitudinal direction L at a greater distance from the central longitudinal axis M than the first, second and third profile portion 3a, 3b, 3c.

In the example scenario of FIG. 1, the two first profile portions 3a.1, 3a.2 have respectively a positive curvature k1, and the two second profile portions 3b.1, 3b.2 have respectively a negative curvature k2. The two third profile portions 3c.1, 3c.2 have, in turn, a positive curvature k3, whereas the two fourth profile portions 3d.1, 3d.2 are formed free of curvature, therefore extend in a rectilinear manner in the longitudinal section which is shown and thus extend with an infinitely great curvature k4.

In the shown longitudinal section illustrated in FIG. 1, along the axial direction A, the profile portions 3a.1-3d.1 or respectively 3a.2-3d.2 extend owing to the axially symmetrical configuration of the profile P with the two profile halves P1, P2 arranged symmetrically to the central longitudinal axis M on both sides along the longitudinal direction L from the central longitudinal axis M to two outer end portions 4a, 4b of the spring element 2 lying opposite one another. The two outer end portions 4a, 4b can respectively be part of a fifth profile portion 3e.1 or respectively 3e.2, which is consequently arranged along the longitudinal direction L at a greater distance from the central longitudinal axis M than the first, second, third, fourth profile portion 3a.1-3d.1 or respectively 3a.2-3d.2. The two fifth profile portions 3e.1 or respectively 3e.2 consequently have a positive curvature k5.

In the example of FIG. 1, the respective first profile portion 3a.1 or respectively 3a.2 continues along the longitudinal direction L away from the central longitudinal axis M into the second profile portion 3b.1 or respectively 3b.2. The second profile portion 3b.1 or respectively 3b.2, in turn, continues along the longitudinal direction L away from the central longitudinal axis M outwards into the third profile portion 3c.1 or respectively 3c.2. The third profile portion 3c.1 or respectively 3c.2 continues along the longitudinal direction L away from the central longitudinal axis M into the fourth profile portion 3d. The fourth profile portion 3d, in turn, continues along the longitudinal direction L away from the central longitudinal axis M outwards into the fifth profile portion 3e.1 or respectively 3e.2. In other words, in the example of FIG. 1, the five profile portions 3a.1-3e.1 or respectively 3a.2-3e.2 directly follow one another along the longitudinal direction L. In addition, in the shown longitudinal section of FIG. 1, the two outer end portions 4.1, 4.2 of the spring element 2 with respect to the longitudinal direction L are connected to one another by means of a connection element 5a.

As FIG. 1 shows, the spring element 2 and the connection element 5a form a closed profile P in the longitudinal section along the axial direction A. In the example, the connection element 5*a* extends in a rectilinear manner along the longitudinal direction L. The connection element 5*a* can be configured in a web-like manner and can be formed by a connection web 6*a*. In this case, as illustrated, the connection web 6*a* can be formed in a strip-shaped or respectively longitudinally-shaped manner along the longitudinal direction L.

In the example of FIG. 1, the connection element 5*a* or respectively the connection web 6*a* is formed integrally on the profile portions 3*a*.1-3*e*.1 or respectively 3*a*.2-3*e*.2. The spring element 2 with the profile portions 3*a*.1-3*e*.1 or respectively 3*a*.2-3*e*.2 running on both sides away from the central longitudinal axis M, and with the connection element 5*a* formed by the connection web 6*a*, is then formed in one piece and of uniform material. Alternatively thereto, the connection element 5*a* can, however, also be formed separately to the spring element 2, therefore as a separate component with respect to the spring element 2, which separate component is connected non-detachably—for example by means of a welded or soldered connection—to the end portions 4*a*, 4*b* or respectively ends of the spring element 2. Alternatively thereto, a detachable connection—in particular a screw connection—is also conceivable.

Figures 2, 3, 4:
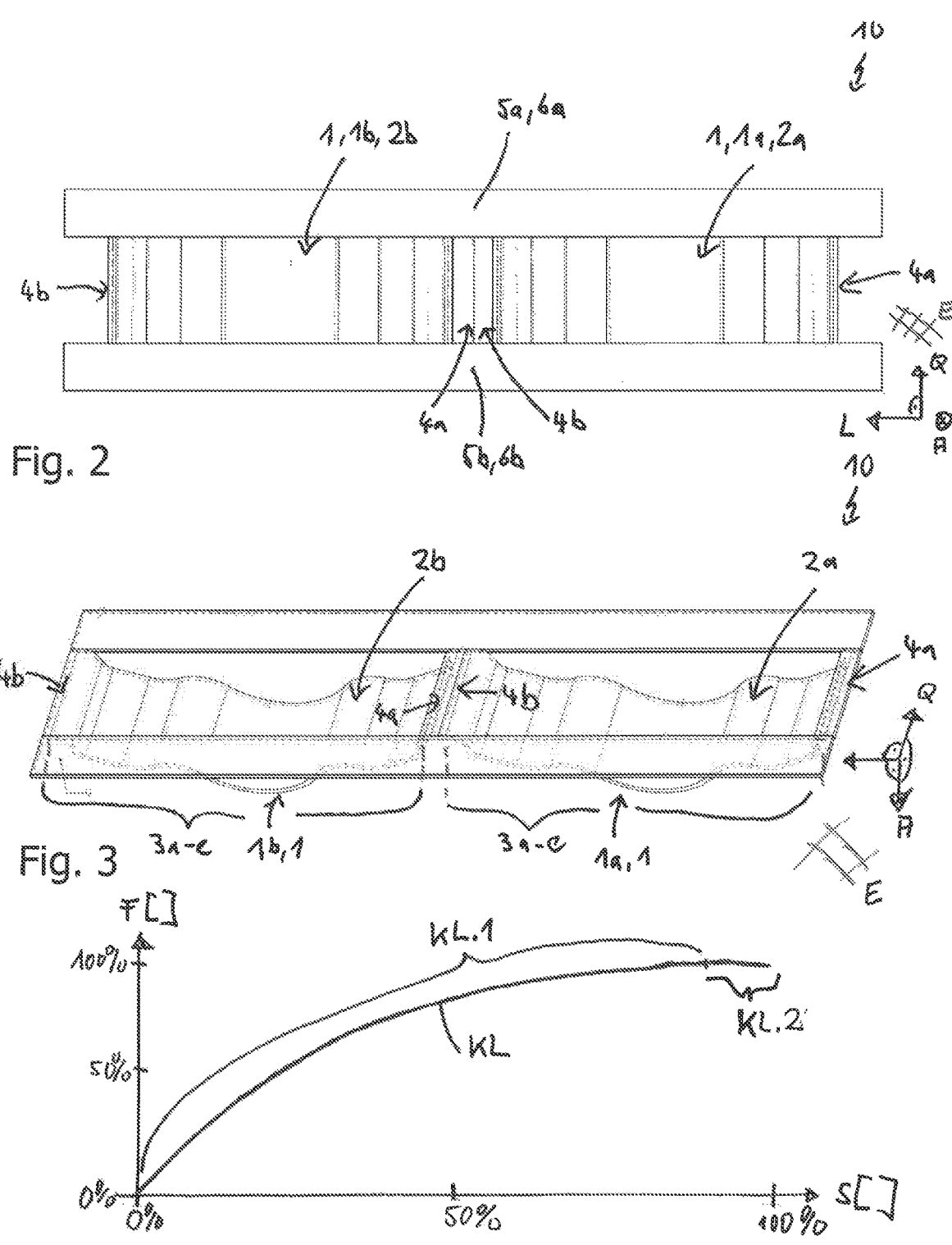
FIG. 2 shows an example of a flat shaped spring arrangement according to the invention, with two flat shaped springs, in an axial top view.
FIG. 3 shows the arrangement of FIG. 2 in perspective illustration.
FIG. 4 shows an example of a force-path characteristic of a flat shaped spring according to the invention.

FIGS. 2 and 3 illustrate an example of a flat shaped spring arrangement 10 according to the invention.

FIG. 2 shows here a top view onto an underside of the flat shaped spring 1 along the axial direction A, FIG. 3 a perspective view. The arrangement 10 comprises not only a single flat shaped spring 1 according to the invention, but a first flat shaped spring 1*a* with a first spring element 2*a* and a second flat shaped spring 1*b* with a second spring element 2*b*, therefore two flat shaped springs 1 following one another along the longitudinal direction L and thus arranged adjacent to one another in longitudinal direction L.

In the flat-shaped spring arrangement 10, the two end portions 4*a*, 4*b* of the spring elements 2*a*, 2*b* of the first and second flat shaped springs 1*a*, 1*b*, facing away from one another along the longitudinal direction L, of two connection elements 5*a*, 5*b* presented above with the aid of FIG. 1, are securely connected to one another.

Therefore, two connection elements 5*a*, 5*b*, and namely a first connection element 5*a* and a second connection element 5*b*, are provided, which both extend at a distance from one another respectively in a rectilinear manner along the longitudinal direction L. The two connection elements 5*a*, 5*b* can be configured in an analogous manner to the example of FIG. 1 respectively as connection web 6*a*, 6*b* with a strip-shaped or respectively longitudinally-shaped geometry along the longitudinal direction L. The two connection elements 5*a*, 5*b* or respectively connection webs 6*a*, 6*b* are arranged at a distance from one another here along a transverse direction Q, which runs orthogonally to the axial direction A and to the longitudinal direction L.

In the top view shown in FIG. 2, the profile portions 3*a*-3*e* extend following one another and continuing into one another likewise along the longitudinal direction L.

Along the transverse direction Q therefore the profile portions 3*a*.1-3*e*.1 or respectively 3*a*.2-3*e*.2 are arranged in a sandwich-like manner between the two connection elements 5*a*, 5*b*. The profile portions 3*a*.1-3*e*.1 to 3*a*.2 to 3*e*.2 and the two connection elements 5*a*, 5*b* or respectively connection webs 6*a*, 6*b* therefore extend parallel to one another along the longitudinal direction L. The two connection elements 5*a*, 5*b* or respectively connection webs 6*a*, 6*b* can be arranged, as shown in FIGS. 2 and 3, in a shared lateral plane E, which extends perpendicularly to the axial direction A. The plane E is spanned through the longitudinal direction L and the transverse direction Q. By comparison, the profile portions 3*a*.1-3*e*.1 or respectively 3*a*.2-3*e*.2, as can be seen from the perspective illustration of FIG. 3, extend in axial direction A out from this plane E.

In addition, the first spring element 2*a* of the first flat shaped spring 1, 1*a* and the second spring element 2*b* of the second flat shaped spring 1, 1*b* are securely connected to one another by their two end portions 4*a*, 4*b* facing on another in longitudinal direction L. These two end portions 4*a*, 4*b*, facing one another, can also be securely connected to the two connection elements 5*a*, 5*b* or respectively connection webs 6*a*, 6*b*. This secure connection can be a materially bonded connection, in particular a welded or soldered connection. The two flat shaped springs 1*a*, 1*b* can, however, also be formed integrally to one another, therefore configured in one piece and of uniform material. Likewise, the two connection elements 5*a*, 5*b* or respectively connection webs 6*a*, 6*b* can be formed integrally on the two flat shaped springs 1*a*, 1*b*.

FIG. 4 shows by way of example a possible standardized force-path characteristic KL of the flat shaped spring 1. The standardized spring path s [ ] is entered on the abscissa, and the standardized force F [ ] is entered on the ordinate as a function of the standardized spring path s. Accordingly, the standardized force-path characteristic KL=F(s) can have a first characteristic portion KL.1 with degressive course KL, which continues with an increasing path s into a second characteristic portion KL.2 with a horizontal course.

The invention claimed is:

1. A flat shaped spring, comprising:
   a spring element having:
      a central longitudinal axis extending along an axial direction; and
      in a longitudinal section along the central longitudinal axis, two profile halves disposed on opposite sides of the central longitudinal axis, the two profile halves each having a first profile portion, a second profile portion, and a third profile portion;
   wherein the first profile portion and the third profile portion each have a curvature opposed to the second profile portion;
   wherein two outer ends of the spring element facing away from the central longitudinal axis, and which lie opposite one another in a longitudinal direction extending perpendicularly to the axial direction, are connected to one another via at least one connection element such that the spring element and the at least one connection element collectively form a closed profile in the longitudinal section;
   wherein the at least one connection element extends from a first outer end of the two outer ends of the spring element to a second outer end of the two outer ends of the spring element;
   wherein, in the longitudinal section, the at least one connection element extends from the first outer end to the second outer end of the spring element in a straight line;
   wherein the two profile halves and the at least one connection element are at least partially arranged in a common plane oriented perpendicular to a transverse direction, the transverse direction extending perpendicular to the axial direction and to the longitudinal direction;
   wherein the first profile portion is disposed adjacent to the central longitudinal axis;
   wherein the second profile portion extends from the first profile portion to the third profile portion;

wherein the first profile portion and the third profile portion each have, in the longitudinal section, an arc-shape that opens toward the at least one connection element; and wherein the second profile portion has, in the longitudinal section, an arc-shape that opens away from the at least one connection element.

2. The flat shaped spring according to claim 1, wherein the second profile portion is arranged a greater distance from the central longitudinal axis than the first profile portion.

3. The flat shaped spring according to claim 1, wherein the third profile portion is arranged a greater distance from the central longitudinal axis than at least one of the first profile portion and the second profile portion.

4. The flat shaped spring according to claim 1, wherein:
the two profile halves each have a fourth profile portion, which is arranged a greater distance from the central longitudinal axis than at least one of the first profile portion, the second profile portion, and the third profile portion; and
the fourth profile portion is formed in a curvature-free manner.

5. The flat shaped spring according to claim 4, wherein:
the two profile halves each have a fifth profile portion, which is arranged a greater distance from the central longitudinal axis than at least one of the first profile portion, the second profile portion, the third profile portion, and the fourth profile portion and includes one of the two outer ends; and
the fifth profile portion has a positive curvature.

6. The flat shaped spring according to claim 1, wherein the at least one connection element is a monolithic body and is integrally connected to the spring element.

7. The flat shaped spring according to claim 1, wherein the flat shaped spring has a standardized force-path characteristic including a first characteristic portion with a degressive course and/or a second characteristic portion with a horizontal course.

8. A flat shaped spring arrangement, comprising:
a plurality of flat shaped springs according to claim 1, the plurality of flat shaped springs including a first flat shaped spring and a second flat shaped spring;
wherein the spring element of the first flat shaped spring and the spring element of the second flat shaped spring are connected to one another via the first outer end of the spring element of the first flat shaped spring and the first outer end of the spring element of the second flat shaped spring that face one another in the longitudinal direction; and
wherein the second outer end of the spring element of the first flat shaped spring and the second outer end of the spring element of the second flat shaped spring, which face away from one another in the longitudinal direction, are connected to one another via the at least one connection element of the first flat shaped spring and/or the at least one connection element of the second flat shaped spring.

9. The flat shaped spring arrangement according to claim 8, wherein the first outer end of the spring element of the first flat shaped spring and the first outer end of the spring element of the second flat shaped spring are connected to one another via the at least one connection element of the first flat shaped spring and/or the at least one connection element of the second flat shaped spring.

10. The flat shaped spring arrangement according to claim 8, wherein a plurality of spring elements form a predetermined geometry.

11. The flat shaped spring arrangement according to claim 10, wherein the predetermined geometry includes at least one of a multi-sided shape, a polygon, a quadrilateral, and a rectangle.

12. The flat shaped spring according to claim 1, wherein the at least one connection element and the spring element are structured as separate, individual components.

13. The flat shaped spring according to claim 1, wherein the at least one connection element is a flat planar body.

14. The flat shaped spring according to claim 1, wherein the at least one connection element has a surface that extends from the first outer end of the spring element to the second outer end of the spring element and that is oriented transversely to the axial direction.

15. The flat shaped spring according to claim 1, wherein:
the two profile halves each further have a fourth profile portion and a fifth profile portion;
the fourth profile portion is linear and extends from the third profile portion to the fifth profile portion; and
the fifth profile portion has, in the longitudinal section, an arc-shape that opens toward the central longitudinal axis.

16. A flat shaped spring, comprising:
a spring element having a central longitudinal axis extending in an axial direction;
two connection elements each extending from a first longitudinal end of the spring element to an opposing second longitudinal end of the spring element such that, in a side view, the spring element and the two connection elements define a closed profile;
the spring element including, in the side view, two profile halves connected to one another at the central longitudinal axis;
wherein the two profile halves each include a first profile portion and a second profile portion curved in opposite directions;
wherein the two profile halves each further include a third profile portion, a linear fourth profile portion, and a fifth profile portion;
wherein the first profile portion is disposed adjacent to the central longitudinal axis;
wherein the second profile portion extends between and connects the first profile portion and the third profile portion;
wherein the fourth profile portion extends between and connects the third profile portion and the fifth profile portion;
wherein the first profile portion and the third profile portion each have, in the side view, an arc-shape that opens toward the two connection elements;
wherein the second profile portion has, in the side view, an arc-shape that opens away from the two connection elements; and
wherein the fifth profile portion has, in the side view, an arc-shape that opens toward the central longitudinal axis.

17. The flat shaped spring according to claim 16, wherein:
the two connection elements includes:
a first connection element at least a portion of which is offset from the spring element in a first lateral direction; and
a second connection element at least a portion of which is offset from the spring element in a second lateral direction opposite the first lateral direction; and
the first longitudinal end and the second longitudinal end of the spring element are disposed opposite one another in a longitudinal direction extending perpendicular to the axial direction, the first lateral direction, and the second lateral direction such that, when viewed in the axial direction, the spring element is at least partially arranged between the first connection element and the second connection element in the first lateral direction and/or the second lateral direction.

18. A flat shaped spring, comprising:

a spring element having a central longitudinal axis extending in an axial direction;

a connection element extending from a first longitudinal end of the spring element to an opposite, second longitudinal end of the spring element such that, in a side view, the spring element and the connection element define a closed profile;

the spring element including, in the side view, two profile halves connected to one another at the central longitudinal axis, the two profile halves each including a first profile portion, a second profile portion, a third profile portion, a linear fourth profile portion, and a fifth profile portion disposed one after another in that order;

wherein the first profile portion is disposed adjacent to the central longitudinal axis;

wherein the first profile portion and the third profile portion each have, in the side view, an arc-shape that opens toward the connection element;

wherein the second profile portion has, in the side view, an arc-shape that opens away from the connection element; and wherein the fifth profile portion has, in the side view, an arc-shape that opens toward the central longitudinal axis.

19. The flat shaped spring according to claim 18, wherein the connection element extends rectilinearly from the first longitudinal end of the spring element to the second longitudinal end of the spring element.

* * * * *